Patented Nov. 8, 1932

1,886,885

UNITED STATES PATENT OFFICE

ANTOINE ADOLPHE KAUFMANN, OF GENEVA, SWITZERLAND

PROCESS FOR THE SEPARATION OF ALCOHOLS AND PHENOLS FROM MIXTURES

No Drawing. Application filed July 29, 1930, Serial No. 471,601, and in Germany August 7, 1929.

In the German Patent Specification No. 444,640 and the German Patent Specification No. 448,419 a process for separating alcohols and pehnols from mixtures is described which is based on the conversion of the alcohols or phenols present by means of the theoretically necessary amount of boric acid, boric anhydride, or triacetyl borate into the difficultly volatile or crystalline triborates. Instead of boric acid, arsenious acid antimonious acid and phosphorous acid may be used.

It has been known since the time of the publication by Pictet and Geleznoff, Ber. 36, p. 2219 et seq., that alcohols and phenols in general react with triacetyl borate. It has been asserted by the applicants, however, that the method may be used technically for the almost quantitative separation of primary, secondary and also tertiary alocohols and phenols from mixtures of terpenes, aldehydes, etc., without the quality of the by-products (for example, aldehydes) suffering during the selected treatment with boric acid. (cf. French Patent Specification No. 601,935).

In the aforementioned specifications, examples are also given from which it follows that menthol from Japanese peppermint oil, geraniol from citronella-Ceylon oil, linalool from Shiu oil, terpineol and borneol from camphor oil fractions may be separated almost quantitatively from their by-products, provided the oils are treated with the amount of boric acid, etc. corresponding to their alcohol content. On the other hand, no proof is given in the places referred to that the by-products, for example, the menthone in peppermit oil or the citronellal in the citronella oil, suffer no change during the selected treatment. This is, however, of particular importance when the value of the by-products, such as, for example, that of the citronellal in citronella oil, is greater than that of the alcohol geraniol which may be isolated.

First of all, therefore, it will be stated here that the aforementioned patented processes are accompanied by disadvantages, which are capable of rendering altogether impossible their general application to the separation of alcohols or phenols from mixtures, as the following examples will show:—

1. If tertiary alcohols such as linalool or terpineol are heated with the amount of boric acid calculated for the formation of the triborates, it may easily be ascertained from the amount of liberated water, that the reaction not only proceeds much more slowly than with primary or secondary alcohols, but comes completely to a stop, even at a temperature of 100° C., after two molecules of alcohol have combined with one molecule of boric acid—or after two molecules of water have been distilled. In the first place, therefore, an acid ester—a di-alcohol borate—is formed, and esterification to neutral borate only sets in again at a higher temperature of about 140° C. If the work is not carried out in vacuo, decomposition of the tertiary alcohol into terpene and water takes place unavoidably at such a temperature. If, on the contrary, the work is carried out in vacuo, as recommended in the patent specification, a portion of the still uncombined alcohol distils over. Thus, the formation of acid borate in the distillation residue can only be avoided by using much less boric acid than required by theory, when of course the separation of the alcohol can by no means be almost quantitative, as maintained in the specification. In addition, the weakly acid action of the diborate is sufficient to decompose namely the sensitive linalool at a high temperature (140° C.) spontaneously into water and terpene. Accordingly, therefore, the separation of linalool and terpineol from mixtures, as described in the aforementioned patent specification, is accompanied at least by the risk of decomposing the tertiary alcohol.

2. If 1.5 kg. of crude citronellal with an aldehyde content of 86.5 per cent and $(\alpha)_D = +10.20$ are heated with 26 gms. of boric acid to 100° C., 25 gms. of water, that is to say, about 4 gms. more than allowed by theory, distil off first, and then in vacuo 1320 gms. citronellal with an aldehyde content of 90 per cent and $(\alpha)_D = +11°$ distil off, while during the decomposition of the residual boric ester, 180 gms. of oil of a sp. gr. of 0.9231 are obtained, which oil was found to be a mixture of geraniol, isopulegol, menthoglycol, etc. By this method therefore, it is not only impossible to separate citronellal from its accompanying alcoholic substances, but the boric acid converts it also into isopulegol and its known condensation products.

3. Crude citral also cannot be purified by means of boric acid.

150 gms. of crude citral with an aldehyde content of 73.1 per cent and $d_{15}° = 0.8975$ gave, after treatment with 4.8 gms. boric acid, during the subsequent distillation only 72 gms. citral with an aldehyde content of 85 per cent. and a sp. gr. of 0.898, and on further heating in vacuo showed distinct signs of decomposition. The residue after being decomposed with water, had a density of 0.905 and an aldehyde content of about 40 per cent. Here also, citral had been decomposed.

These examples will suffice to show that the acid reaction of boric acid and its acid esters is sufficient to decompose sensitive substances such as tertiary alcohol or aldehydes such as citronellal and citral.

The decomposition of the said substances naturally takes place much more rapidly and completely when the boric acid, etc., is present in excess. Since, moreover, the present-day analytical methods do not allow the alcohol content to be determined accurately in mixtures of citral, citronellal, geraniol, citronellol, eugenol, elemol, cadinol and their esters, such as occur for example, in Java citronel oil, either it will never be possible to avoid partial decomposition, or such a small weight of boric acid will have to be used that the separation of the alcohols can no longer be "almost quantitative".

The processes described in the aforementioned specifications are therefore practically useless for complex mixtures or sensitive substances such as tertiary alcohols, citronellal, citral, etc.

All these disadvantages in the separation of terpene alcohols or phenols from mixtures which contain these alcohols or phenols are avoided, however, if, as I have discovered, instead of free boric acid or even the mixed boric acetic ester or any of the reagents enumerated in the aforementioned specifications, the neutral volatile alkyl esters of boric acid, such as trimethyl-, triethyl-, tripropyl-, tributyl-, and triamyl-borate, that is the earliest known members of the aliphatic series, are allowed to act upon the mixtures. When these neutral boric esters are heated with the higher alcohols for instance, terpene alcohols, which are to be isolated, either alone or in mixtures, esterification generally occurs even below 100° C. The alcohol of lower boiling point distills over and the difficultly volatile alcohol borate for example terpene alcohol borate, is formed and remains behind as residue. This borate after eventually being purified by crystallization, is decomposed with water or alkali. The esterification takes place for example, according to the following equation:

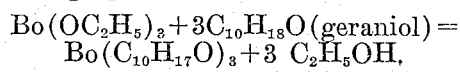
$$Bo(OC_2H_5)_3 + 3C_{10}H_{18}O \text{(geraniol)} = Bo(C_{10}H_{17}O)_3 + 3\ C_2H_5OH.$$

With tertiary alcohols such as linalool or terpineol, which as previously pointed out, react with difficulty with boric acid, mixed esters are first formed, preferably with 2 molecules of tertiary alcohol:—

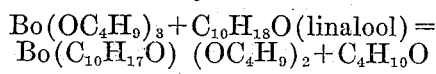
$$Bo(OC_4H_9)_3 + C_{10}H_{18}O \text{(linalool)} = Bo(C_{10}H_{17}O)(OC_4H_9)_2 + C_4H_{10}O$$

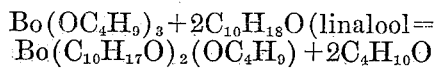
$$Bo(OC_4H_9)_3 + 2C_{10}H_{18}O \text{(linalool)} = Bo(C_{10}H_{17}O)_2(OC_4H_9) + 2C_4H_{10}O$$

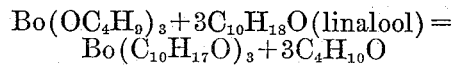
$$Bo(OC_4H_9)_3 + 3C_{10}H_{18}O \text{(linalool)} = Bo(C_{10}H_{17}O)_3 + 3C_4H_{10}O$$

Thus, in all cases, neutral esters only are formed so that an acid reaction never occurs at all and decomposition of even very sensitive substances is entirely excluded. Naturally the use of a considerable excess of very volatile neutral volatile alkyl esters of boric acid is also absolutely harmless so that a reliable quantitative separation of all alcohols or phenols in all mixtures is ensured. Naturally also a separation of the alcohols of different classes may be effected by only adding the amount of boric ester which is necessary for combining with the most easily reacting alcohol, the more difficultly reacting alcohols being distilled off.

The working up of the reaction products by fractional distillation offers no particular difficulty, since the esters may be so selected that the fatty alcohols produced, as also the boric ester itself, which is added in excess, have boiling points which differ from these of substances, such as, for example, terpenes and aldehydes, accompanying the terpene alcohols or phenols which are to be separated. In the case of the formation of mixed triborates, especially with tertiary alcohols, two alcohols are formed on decomposition with water, but their separation by fractional distillation likewise offers no difficulty. Finally, the recovery of the reagents, i. e. the neutral volatile alkyl esters of boric acid, is possible at inconsiderable expense compared with the result obtained.

Example I 4.5 kg. of Shiu oil, with an alcohol content of about 81 per cent. and a camphor content of 6.2 per cent is heated in vacuo with 3.5 kg. of tributyl borate. Butyl alcohol, which may easily be collected separately, distils over first followed by terpenes, camphor and finally the excess of tributyl borate, which contains further quantities of camphor in solution. The temperature of the bath may be increased to 160° C. without any decomposition becoming perceptible. The whole of the camphor, namely 275 gms., may be recovered from the distillate. Consequently the borate—a mixtures of a little dilinalylbutylborate and much trilinalyl borate—after decomposition with sodium carbonate solution, no longer possesses a camphor content, and on steam-distillation of the oil, an almost pure linalool with about 5 to 10 per cent butyl alcohol, but absolutely free from camphor is obtained. The yield of pure linalool corresponds with the content found in the crude oil.

*Example II*

10 kg. of dehydrated citronell=Java-oil, sp. gr. 0.8868 and $(\alpha)_D -2.12°$, with a total geraniol content of 90 per cent., an aldehyde-ketone content of 40 per cent. and an ester content of 7.9 per cent, is distilled with 2.5 kg. of triethyl borate. Ethyl alcohol is first distilled over, followed by excess of triethyl borate, and then successively:— about 3 per cent terpenes with $(\alpha)_D =$ about $-90°$
about 0.3 per cent methyl heptenon
about 35 per cent citronellal
about 12 per cent citral, esters and sesquiterpenes.

The main product, citronellal, has a sp. gr. of 0.854, $(\alpha)_D = +10.6°$ and an aldehyde content of 98 per cent. It has a very faint odor.

The boric-ester residue decomposes even with hot water. The resulting oil has a sp. gr. of 0.8945 and an alcohol content of 82.3 per cent., but is practically free from aldehyde and ester. On fractional distillation, the following are obtained:— about 100 gms. isopulegol
about 1,200 gms. citronellol-d
about 2,100 gms. geraniol
about 200 gms. eugenol
about 750 gms. sesquiterpene alcohols (elemol and cadinol) and heavy terpenes.

A distillation residue of only 230 gms. is left.

Having now particularly described and ascertained the nature of my said invention and in what manner the same is to be performed, I declare that what I claim is:—

1. A process for the separation of alcohols and phenols from mixtures consisting in treating the mixtures containing monohydric alcohols and phenols in question with neutral volatile, alkyl esters of inorganic acids, belonging to the periodic group including boron, removing by distillation the non-alcoholic and non-phenolic constituents, decomposing the residual esters, the alcohols and phenols being thereby obtained.

2. A process for the separation of alcohols and phenols from mixtures containing monohydric alcohols and phenols consisting in heating the mixtures in question with neutral esters of inorganic acids, removing by distillation the non-alcoholic and non-phenolic constituents, purifying the residual esters by crystallization, decomposing the same with water, and fractionating the resulting mixture of alcohols and phenols.

3. A process for the separation of alcohols and phenols from mixtures containing monohydric alcohols and phenols consisting in heating the mixtures in question with neutral volatile, alkyl esters of inorganic acids belonging to the periodic group including boron, removing by distillation the non-alcoholic and non-phenolic constituents, purifying the residual esters by crystallization, decomposing the same with alkali and fractionating the resulting mixture.

4. A process for the separation of terpene-alcohols from mixtures containing the same consisting in treating the mixtures in question with neutral volatile, alkyl esters of boric acid, whereby the boric ester of terpene alcohols are formed, removing by distillation the non-alcoholic constituents, purifying by crystallization the residual boric esters, decomposing the same with water, and fractionating the resulting mixture of terpene alcohols.

5. A process for the separation of monohydric alcohols from Shiu oil consisting in heating this oil in vacuo with tributyl borate, removing by distillation butyl alcohol, terpenes, camphor and the excess of tributyl borate which contains further quantities of camphor in solution, decomposing the residual borate with sodium carbonate solution, distilling with steam the resulting oil, whereby linalool is obtained.

6. A process for the separation of monohydric alcohols from dehydrated citronell-Java-oil consisting in distilling this oil with triethylborate, whereby ethyl alcohol, excess of triethylborate, terpenes, methylheptenone, citronellal, citral, esters and sesquiterpenes are distilled over, decomposing the non-volatile boric ester residue with hot water and fractionating the resulting oil, whereby the following alcohols and phenols are obtained: isopulegol, citronellol-d, geraniol, eugenol, sesquiterpene alcohols (elemol and cadinol) and heavy terpenes.

7. A process for the separation of terpene alcohols from mixtures containing the same for the purpose of obtaining an approximate separation of alcohols of different classes, consisting in treating the mixture with only that amount of a neutral volatile, alkyl ester of boric acid which is necessary for combining with the more readily reacting alcohol.

8. A process for the separation of monohydric alcohol and monohydric phenols from mixtures containing the same, consisting in treating the mixtures in question with neutral volatile alkyl esters of boric acid, removing by distillation the non-alcoholic and non-phenolic constituents of the mixture, decomposing the residual borates, the alcohols and phenols being thereby obtained in a pure state.

9. A process for the separation of monohydric alcohols and monohydric phenols from dehydrated ethereal oils, consisting in heating these oils with neutral volatile boric esters of the methyl, ethyl, propyl, and amyl alcohols, removing by distillation the non-alcoholic and non-phenolic constituents of the ethereal oils, decomposing the residual non-volatile borates, the alcohols and phenols being thereby obtained.

10. A process for the separation of terpene-alcohols from mixtures containing the same, consisting in dehydrating the mixture, adding to these mixtures, after dehydrating same, neutral volatile alkyl esters of boric acid, removing the corresponding aliphatic alcohols by heating, whereby boric esters of the terpene-alcohols are formed, then removing by further distillation the non-alcoholic constituents, decomposing the residual borates of terpene-alcohols with water and alkali and fractionating the resulting mixture of terpene alcohols.

In testimony whereof I have affixed my signature.

ANTOINE ADOLPHE KAUFMANN.